(12) United States Patent
Dhayni

(10) Patent No.: US 9,306,631 B2
(45) Date of Patent: Apr. 5, 2016

(54) NFC READER TRANSMISSION SIGNAL PRE-DISTORSION

(71) Applicant: ST-Ericsson SA, Plan-les-Ouates (CH)

(72) Inventor: Achraf Dhayni, Vallauris (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 0 days.

(21) Appl. No.: 14/443,680

(22) PCT Filed: Nov. 21, 2013

(86) PCT No.: PCT/EP2013/074342
§ 371 (c)(1),
(2) Date: May 19, 2015

(87) PCT Pub. No.: WO2014/082914
PCT Pub. Date: Jun. 5, 2014

(65) Prior Publication Data
US 2015/0303994 A1 Oct. 22, 2015

Related U.S. Application Data

(60) Provisional application No. 61/736,625, filed on Dec. 13, 2012.

(30) Foreign Application Priority Data

Nov. 27, 2012 (EP) ..................................... 12306465

(51) Int. Cl.
*H04B 5/00* (2006.01)
*H04W 4/00* (2009.01)

(52) U.S. Cl.
CPC ............ *H04B 5/0031* (2013.01); *H04B 5/0081* (2013.01); *H04W 4/008* (2013.01)

(58) Field of Classification Search
CPC ........ H04W 4/008; H04B 1/62; H04B 5/0031
USPC ......................................................... 455/41.1
See application file for complete search history.

(56) References Cited

U.S. PATENT DOCUMENTS

2010/0151787 A1* 6/2010 Contreras ................ H04B 1/44
455/41.2
2011/0054571 A1 3/2011 Corndorf

FOREIGN PATENT DOCUMENTS

| EP | 1 533 624 A1 | 5/2005 |
|----|--------------|--------|
| EP | 2 367 294 A1 | 9/2011 |

OTHER PUBLICATIONS

International Search Report issued in corresponding International application No. PCT/EP2013/074342, date of mailing of the report Dec. 16, 2013.

(Continued)

*Primary Examiner* — Eugene Yun
(74) *Attorney, Agent, or Firm* — Patent Portfolio Builders PLLC

(57) ABSTRACT

A method of conditioning a first signal transmitted between a first and a second near field communication, NFC, device, the method comprising: determining a transfer function representative of a distortion arising from transfer of a signal from the first NFC device to the second NFC device; determining a pre-distortion function from the transfer function; and applying the pre-distortion function to the first signal, wherein the pre-distortion function at least partially compensates for the determined transfer function.

17 Claims, 8 Drawing Sheets

(56) References Cited

OTHER PUBLICATIONS

Extended European Search Report issued in corresponding European application No. Ep 12 30 6465, date of completion of report May 7, 2013.

IEEE, "IEEE Standard Methods for Measuring Transmission Performance of Analog and Digital Telephone Sets, Handsets, and Headsets, IEEE Std. 269-2002 (Revision of IEEE Std. 269-1992)," Published by The Institute of Electrical and Electronics Engineers, Inc. 3 Park Avenue, New York, NY 10016-5997, USA, Apr. 25, 2003, XP017603597, ISBN: 978-0-7381-3477-2.

* cited by examiner

NFC READER TRANSMISSION SIGNAL PRE-DISTORSION

BACKGROUND

1. Technical Field

The described embodiments generally relate to an apparatus and method for providing near-field communication (NFC). More particularly, the application relates to apparatus and methods capable of providing high bit rate NFC transmission with an enhanced power efficiency. The embodiments also relate to computer program products for implementing the methods.

The embodiments may find applications in, in particular, wireless devices such as mobile terminal systems, e.g., cell phones, smart phones, etc., or tablets, laptop computers, etc.

2. Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

NFC is a technology which provides a means of one or two-way communication between electronic devices over a short range, typically a few centimeters. Such communication is increasingly being implemented in devices such as mobile telephones for implementing, for example, cashless-payment systems.

Typically, under the ISO/IEC 18000-3 standard, the maximum data rate that is achievable with NFC is limited to 424 kbit/s. This relatively low data rate tends to limit the applications to which NFC technology can be applied. Accordingly, a challenging aspect of the design of new devices supporting this technology has been to increase the maximum data rate of the NFC devices. Further, due to inherent inefficiencies in NFC technology, in order to achieve a high data rate, a high transmission power must be used. For mobile devices, there is therefore also a need to improve the efficiency of NFC systems to permit lower transmission powers to be used for a given data rate. In addition external influences, such as nearby metallic objects or external electric and/or magnetic fields, can adversely affect the achievable data rate.

It is an aim of the embodiments herein described to overcome or mitigate at least some of the above described limitations.

SUMMARY

A first aspect relates to a method of conditioning a first signal transmitted between a first and a second near field communication, NFC, device, the method comprising: determining a transfer function representative of a distortion arising from transfer of a signal from the first NFC device to the second NFC device; determining a pre-distortion function from the transfer function; and applying the pre-distortion function to the first signal, wherein the pre-distortion function at least partially compensates for the determined transfer function.

Thus, advantageously, the method allows a signal being pre-distorted in such a manner so as to compensate for a distortion that the signal will experience on emission. Thus, the signal emitted can be essentially free from such distortion.

In some embodiments, the transfer function is determined by calculating a cross-correlation of a second signal with a version of the second signal modified by the transfer function. Thus, advantageously, a second signal, in the form of a training signal, can be used and the cross-correlation can be used to easily determine the transfer function.

In some embodiments the second signal comprises a maximum length sequence, MLS. Thus, advantageously, the MLS can be used to determine the transfer function in an efficient manner.

In some embodiments, the second signal is emitted during an evaluation period prior to commencement of near field communications, and the first signal is emitted during near field communications. In embodiments, the pre-distortion function is calculated during the evaluation period, and is subsequently applied during near field communications. Thus, advantageously, the transfer function can be determined once, prior to commencement of communications, and the same transfer function can be used throughout communications without the need to recalculate the transfer function.

For example, the pre-distortion function, hd(t), may satisfy the relation:

$$hd(t)*h(t)=\delta(t)$$

where h(t) is the transfer function,
\* represents the convolution operator, and
δ(t) is the Dirac impulse signal.

Thus, advantageously, the embodiments provide a simple manner of calculating a pre-distortion function that compensates for the prevailing distortion.

In some embodiments, the pre-distortion function is applied to an over-sampled version of the first signal. Thus, advantageously, a pre-distortion function with a higher time resolution than the first signal can be generated, thereby allowing an improved compensation of the prevailing distortion to be applied.

In some embodiments, the pre-distortion function is applied to the first signal by convolving the pre-distortion function with the first signal. Thus, advantageously, a simple mathematical operation can be used to derive a signal for transmission.

In some embodiments, the convolution is applied digitally in the form of discrete coefficients. Thus, advantageously, the convolution can be applied using digital electronics.

In a second aspect, there is proposed an apparatus for near field communications, NFC, the apparatus comprising: an NFC emitter, a transfer function calculation module for determining a transfer function representative of a distortion arising from emission by the NFC emitter when in communication range with another NFC apparatus; a pre-distortion function generator for determining a pre-distortion function from the transfer function; and a pre-distortion function application module for applying the pre-distortion function to a signal for transmission by the NFC apparatus wherein; the pre-distortion function at least partially compensates for the determined transfer function.

In a third aspect, there is proposed a computer program product comprising computer readable instructions which, when implemented on a processor, cause the processor to perform the method of the first aspect.

In a fourth aspect, a computer readable medium is proposed which comprises the computer program product of the third aspect.

BRIEF DESCRIPTION OF THE DRAWINGS

The present invention is illustrated by way of example, and not by way of limitation, in the figures of the accompanying drawings, in which like reference numerals refer to similar elements and in which.

DETAILED DESCRIPTION

Figure 1:
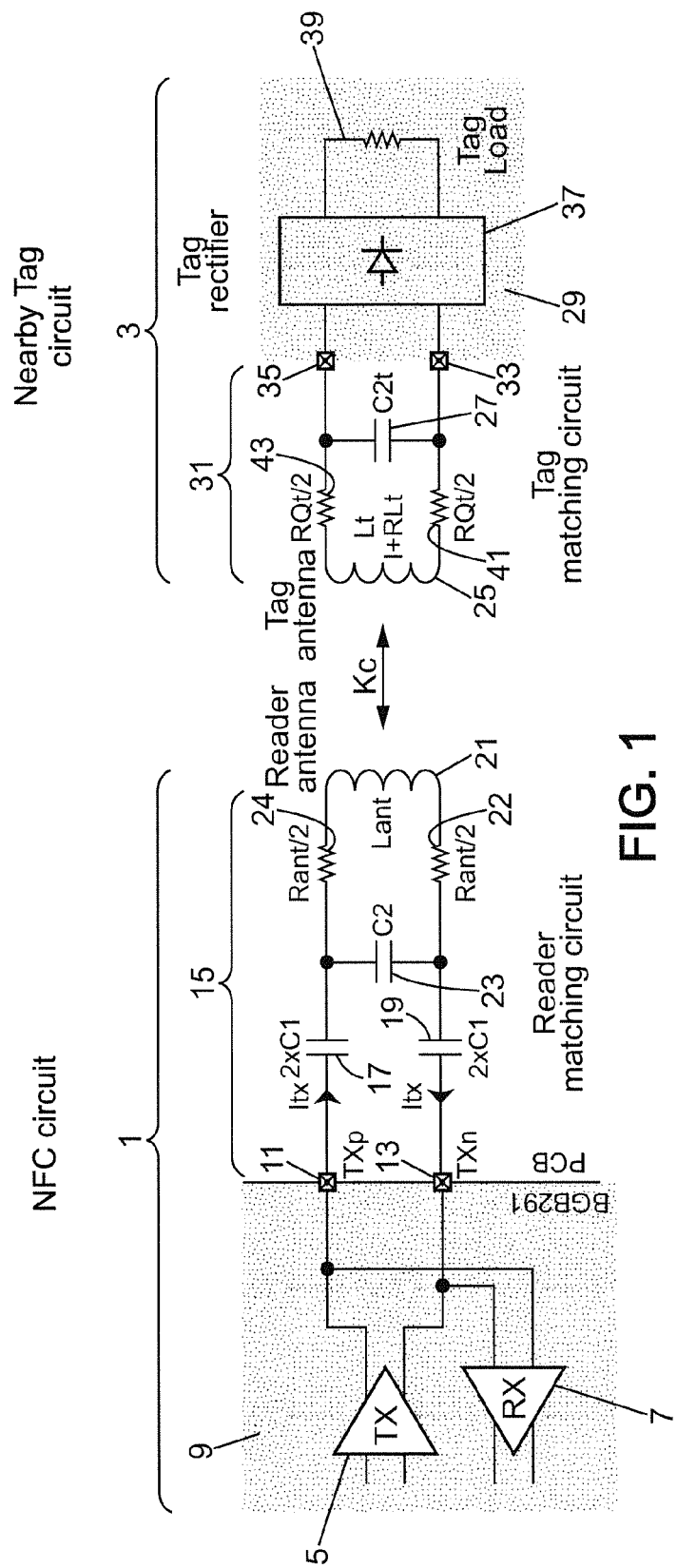
FIG. 1 illustrates an NFC reader circuit that is in proximity with an NFC tag circuit.

FIG. 1 illustrates a typical NFC reader circuit 1 in proximity to a tag circuit 3. The NFC reader circuit 1 can be present in, for example, a reader for a cashless payment system, such as at a checkout in a shop. The tag circuit 3 can be present in, for example, a mobile communication device such as a mobile telephone, or could equally be present in a stand-alone device such as an electronic payment terminal. The described embodiments are not limited to NFC established between a NFC device and a tag device. Rather, NFC could equally be established between two NFC devices.

As illustrated in FIG. 1, the NFC circuit 1 is implemented with a transmitter 5 and a receiver 7 present in an integrated circuit 9. As illustrated in FIG. 1, the integrated circuit employed in the described embodiment is a BGB291 chip, however the skilled person will recognize that other integrated circuits can equally be employed, or indeed circuits could be constructed from discrete components. Two outputs 11, 13 from the integrated circuit 9 provide connection terminals for connection of the reader matching circuit 15 to the integrated circuit 9. The first terminal 11 is termed the $TX_p$ terminal, while the second 13 is termed the $TX_n$ terminal. The transmitter 5 and receiver 7 circuits may be circuits as known in the art, and the particular circuits used are not important for the function of the described embodiment. Accordingly, a detailed description of the circuits will be omitted. It shall be sufficient, for the purpose of the present description, to state that the transmitter circuit 5 is configured to provide an electrical signal for transmission by the NFC antenna 21, while the receiver circuit 7 is configured to receive a similar electrical signal from the NFC antenna 15. During NFC communications, as will be described below, the antenna and receiver circuits form a resonator that resonates at a frequency that is dependent on the various parameters of the combined resonating circuit.

The antenna matching circuit may comprise at least three capacitors 17, 19, 23. A first terminal of a first capacitor 17 is connected to the $TX_p$ terminal 11, while a second capacitor is connected to the $TX_n$ terminal 13. The second terminals of the first and second capacitors 17, 19 are each connected to a terminal of the third capacitor 23. The NFC antenna 21 is coupled across the terminals of the third capacitor 23. Thus, the NFC antenna 21 is connected in parallel with the third capacitor 23.

In the shown embodiment, the NFC antenna 21 comprises a loop antenna. However, the skilled person will recognize that other antenna types can equally be used and that the particular antenna structure employed is not important for the described embodiment.

The NFC antenna 21 has a characteristic inductance, $L_{ant}$, and a characteristic resistance $R_{ant}$. For the purposes of analyzing the antenna matching circuit 15, the antenna 21 is illustrated as comprising two resistors 22, 24 connected in series either side of an inductor. Each of the resistors 22, 24 may have a resistance equal to half the actual resistance of the NFC antenna 21, i.e. $R_{ant}/2$. Typically the resistance may be an observed parasitic resistance which is intrinsically present in the antenna, but additional resistor components can also be present in the circuit.

Also illustrated in FIG. 1 is a nearby tag circuit 3. In this context, 'nearby' implies that the NFC circuit 1 and the tag circuit 3 are in sufficiently close proximity to interact via RF signals being exchanged between their antennas. Typically, such a distance will be limited to being of the order of a few centimeters, although distances of up to the order of a few meters can be employed for certain embodiments. As illustrated in FIG. 1, the interaction between the reader circuit 1 and the tag circuit 3 is indicated by the presence of a coupling factor '$k_c$'. Further details of the coupling factor $k_c$ will be explained below.

The tag circuit 3 comprises a tag antenna 25. Again, the tag antenna 25 can take the form of a loop antenna. However, the skilled person will recognize that other antenna types can equally be used and that the particular antenna structure employed is not important for the described embodiment.

In a similar fashion to the NFC antenna matching circuit, the tag antenna 25 is connected in parallel with a tag capacitor 27. As illustrated in FIG. 1, the tag capacitor 27 forms the basis of the tag matching circuit 31. The tag matching circuit 31 is connected to a tag circuit 29. In the illustrated embodiment, the tag circuit 29 comprises a rectifier 37 which has two terminals 33, 35 at its input side. One terminal 33 is connected to one end of the tag antenna 25, while the other terminal 35 is connected to the other end of the tag antenna 25. A load resistor 39 is connected across the output side of the rectifier.

The tag antenna 25 has a characteristic inductance, $L_t$, and a characteristic resistance $R_t$. For the purposes of analyzing the antenna matching circuit 31, the antenna 25 is illustrated as comprising two resistors 41, 43 connected in series either side of an inductor. Each of the resistors 41, 43 has a resistance equal to half the actual resistance of the tag antenna 25, i.e. $RQ_t/2$.

As noted above, the present embodiment is described in terms of an interaction between an NFC circuit 1 and a tag circuit 3. The skilled person will recognize that the interaction could equally be described in terms of an interaction between two NFC circuits. In such a circumstance, the second NFC circuit can be essentially similar to the NFC circuit 1 as described above.

In use for NFC, a transmission signal is generated by the transmitter 5 in the NFC circuit 1. The transmission signal is emitted by the NFC antenna 21, received by the tag antenna 25 and modified in some way by the tag circuit 3. The modified signal is then re-radiated by the tag antenna 25 and received by the NFC antenna 21. The received signal is then passed to the receiver 7.

The skilled person will recognize that a resonating circuit may be created by the combination of the following:

a. The antenna matching circuit components (C1, C2, and Rant) in the antenna matching circuit 15 and the tag matching circuit 31.

b. The inductance ($L_{ant}$) of the reader antenna 21 and of the tag antenna 25.

c. The nearby Tag load 39.
d. The antenna to antenna coupling factor ($k_c$).
e. The NFC TX 5 source impedance.

During NFC communication, this resonating circuit loads the Reader TX 5. The load of the resonating circuit as seen at the output of the Reader TX 5 ($TX_p$ 11 and $TX_n$ 13 in FIG. 1) is determined by a quality factor (Q) of the resonating circuit. The quality factor (Q) characterizes the resonating circuit bandwidth relative to its centre frequency (named also "resonance frequency" $f_0$). The skilled person will understand the meaning of the quality factor Q, and so a full explanation will not be repeated here.

Figure 2:
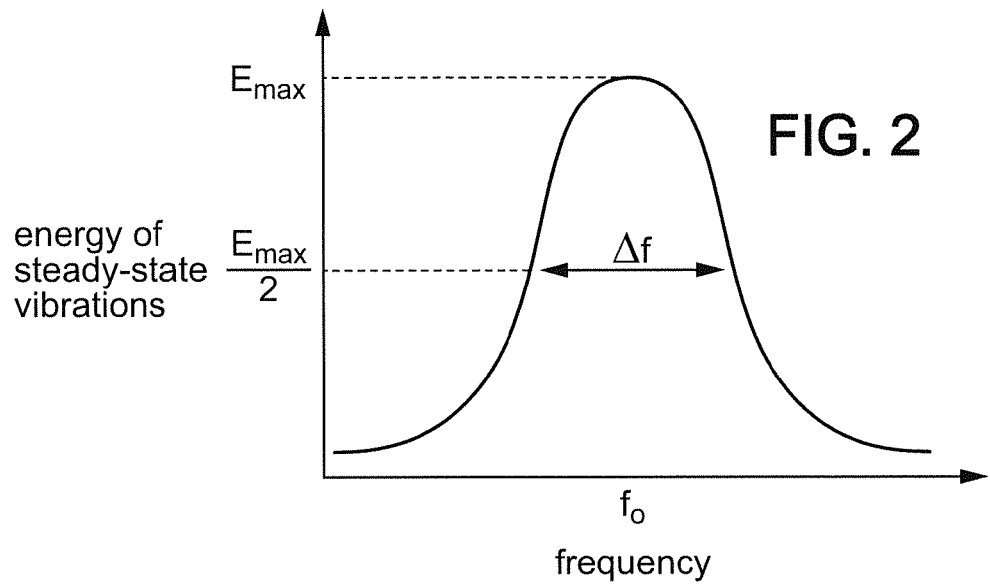
FIG. 2 illustrates the energy of steady-state vibration of the combined circuits shown in FIG. 1 as a function of vibration frequency.

However, to illustrate the quality factor, FIG. 2 illustrates the energy of steady-state vibration for the loading resonating circuit as a function of frequency. As can be seen an approximately Gaussian profile is observed, with a peak centred at a frequency $f_0$. The full-width at half maximum of the peak is termed the bandwidth, $\Delta f$. The Q factor of the resonator, or filter, is defined to be $f_0/\Delta f$. Thus, the higher the value of Q, the narrower, or sharper, and higher the peak is. It is also worth noting that, generally speaking, the area under the profile is constant for a given set of conditions. Thus, if the Q value is increased by some means, the peak must become narrower and sharper to compensate.

In the time domain, a higher Q indicates a lower rate of energy loss relative to the stored energy of the resonator. In other words, the oscillations die out more slowly. For large values of Q, the Q factor is approximately equal to the number of oscillations required for a freely oscillating system's energy to fall to about 0.2%, of its original energy.

In the frequency domain a higher Q indicates a higher attenuation of the Reader TX 5 signal frequency components below and above the centre frequency. With a higher Q, the rise and fall times of the Reader TX 5 signal are longer which limits the maximal possible bit rate in the NFC Reader TX 5 signal. A higher Q value also indicates a lower attenuation of the Reader TX 5 signal frequency components near the resonance frequency $f_0$. Typically, the resonant frequency is chosen to be 13.56 MHz.

In some examples, amplitude shift keying (ASK) may be employed as the modulation type of the Reader TX signal. Accordingly, the carrier frequency of the ASK TX signal is denoted by $f_c$.

In general, for a good design the above listed values [from (a) to (e)] are chosen in combination to achieve the desired Q value. However, there are two competing factors:

1. The quality factor, Q, should be as large as possible in order to have the lowest attenuation of the data frequency components of the Reader TX signal. This allows high output power efficiency of the TX signal at $TX_p$ and $TX_n$. A high output power efficiency is equivalent to having higher current flowing in the NFC circuit antenna. This in turn implies that a large magnetic field is generated.

2. The quality factor, Q, should be as low as possible in order to attain smaller rise and fall times in the TX signal at $TX_p$ and $TX_n$ Having smaller rise and fall times means that higher bitrates can be transmitted on the TX signal at $TX_p$ and $TX_n$.

Since these two factors are competing, in general a compromise is made between the output power efficiency and the maximum bit rate when choosing the quality factor, Q, value.

The presently described embodiment provides a method to increase the TX bit rate without being obliged to lower the quality factor, Q, to thereby reduce the power efficiency. The method comprises pre-distorting the TX signal. During transmission across the antenna $L_{ant}$, the pre-distortion is such that it cancels out the Q-factor transfer function that loads the Reader TX signal. In this way, the TX signal can have much higher rise and fall times and therefore a much higher bit rate.

There now follows a more in-depth discussion of the two competing factors that determine the optimum Q value as discussed above.

At resonance $$\omega \cong \frac{1}{\sqrt{L_{ant} \cdot (C1 + C2)}}$$

where $\omega$ is the angular frequency in radians/second. i.e. $\omega = 2\pi \cdot f_0$ Under these circumstances, the impedance presented at the TX pin equals:

$$Ztx \cong \frac{R_{ant} \cdot L_{ant} \cdot (C1 + C2)^2}{L_{ant} \cdot C1^2 + R_{ant}^2 \cdot C2^2 \cdot (C1 + C2)} = \frac{R_{ant} \cdot (C1 + C2)^2}{C1^2 + \frac{C2^2}{Q^2}} \quad (1)$$

Where $Q = \frac{\omega \cdot L_{ant}}{R_{ant}} = \frac{\sqrt{L}}{R_{ant} \cdot \sqrt{C1 + C2}}$ With a reasonably high Q, this can be simplified to:

$$Ztx = R_{ant} \cdot \left(\frac{C1 + C2}{C1}\right)^2$$

Thus, the antenna resistance is up-transformed to the required impedance at the TX pin(s). If we calculate the current flowing through the antenna as a function of the TX output current, we get:

$$\frac{I_{ant}}{I_{tx}} = \frac{C1 + C2}{C1}$$

The antenna current can thus be written as function of the TX output voltage:

$$I_{ant} = \frac{V_{tx}}{R_{ant}} \cdot \left(\frac{C_1}{C_1 + C_2}\right) \quad (2)$$

For a loop antenna, the generated magnetic field is given by the following equation:

$$Hm = I_{ant} * N * r^2 / 2[(r^2 + x^2)^3]^{0.5} \quad (3)$$

Where:
Hm=the generated magnetic field (A/m);
N=the number of turns in the NFC loop antenna;
r=radius of the loop antenna (in meters, m); and,
x=the distance from the centre of the loop antenna (in m).

As can be clearly seen from equation (3), the generated magnetic field is directly proportional to $I_{ant}$. This is the case for all antennas.

Thus, from equations (1) (2), the higher Q is, the higher $I_{ant}$ is. However, according to equation (3), the generated magnetic field is directly proportional to $I_{ant}$. This implies that the higher Q is, the higher the generated magnetic field is. In other words, increasing Q increases the power efficiency which is a desired feature. This proves theoretically point 1 mentioned above.

Above resonance, the antenna current as a function of TX output voltage is:

$$I_{ant} = \frac{V_{tx}}{\omega \cdot L_{ant}} \cdot \left(\frac{C_1}{C_1 + C_2}\right)$$

So, the matching circuit attenuation for frequencies much greater (>>) than $f_0$ equals:

$$\frac{G(f_0)}{G(f)} = Q \cdot \frac{f}{f_0}$$

Where $f_0$ is the resonance frequency.

The above equation shows that, at higher Q, the attenuation of higher frequencies is greater, i.e. rise and fall times are longer. This proves theoretically point 2 mentioned above.

NUMERICAL EXAMPLE

In accordance with point 2, the maximally allowed Q-factor for the matching network is determined by the timing requirements of the ASK waveforms. The requirements on 10%-to-90% rise/fall-time ($T_{rf}$) for the different bitrates are summarized in the table below (this is as presented in the ISO14443 specifications):

TABLE 1 specified Maximal $T_{rf}$ for each bitrate case. This specification corresponds to ASK Reader TX signals. In this specification, four different bit rates are specified.

| | Bitrate (kb/s) | | | |
|---|---|---|---|---|
| | 106 | 212 | 424 | 848 |
| Maximal $T_{rf}$ | 16/fc | 11/fc | 9/fc | 5/fc |

Figure 3:
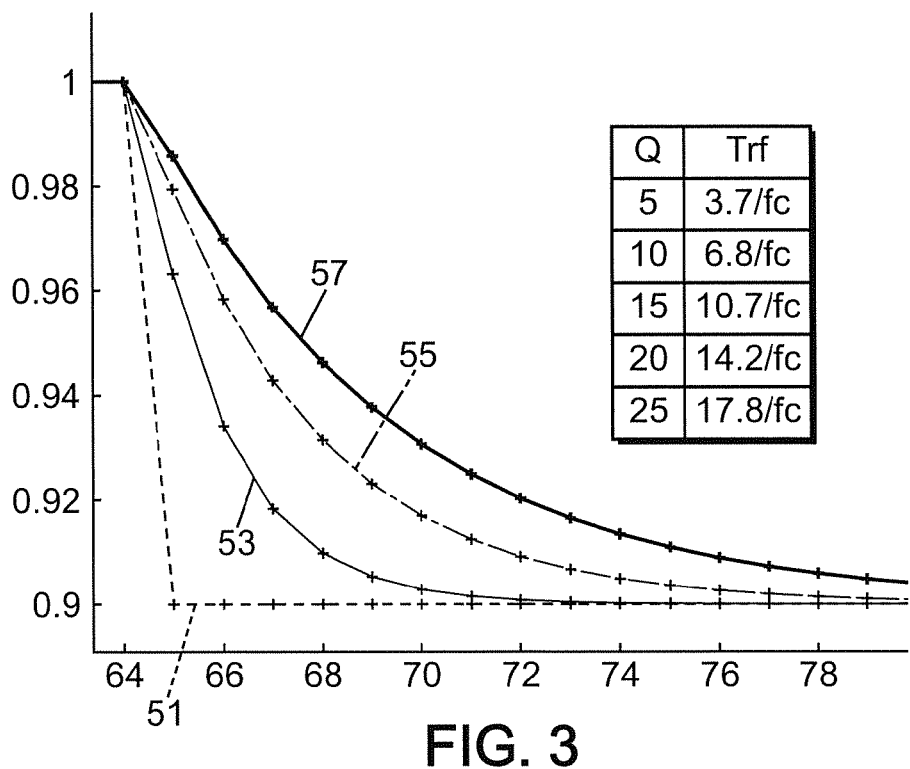
FIG. 3 illustrates amplitude decay times for resonating circuits of various different quality factors.

Simulating the ASK signal with different Q-factors, results in the plot illustrated in FIG. 3, where the envelope of the signal (falling edge from 1 to 0.9) is shown as a function of time (units: periods of fc) for different Q-factors. As can be expected, higher Q-factors result in longer fall-times (we can similarly prove the same thing for the rise-times).

FIG. 3 illustrates the ASK envelop amplitude versus time. The unit used on the x-axis is equal to periods of fc. The first curve 51 shows the falling edge of the ideal signal that we would like to generate, in other words, the un-filtered response.

The second curve 53 corresponds to a Q value of 5, the third 55 to a Q value of 10 and the fourth 57 to a Q value of 15. As can be seen in FIG. 3, due to the Q-factor of the resonating circuit loading the ASK signal of the reader TX, the fall time of the ideal signal increases with increasing Q.

From these simulation results the maximally allowed Q-factor for the highest bitrate (848 kb/s) is between 5 and 10. More precisely, the value is ≈6 as can be deduced from the Table of FIG. 3, by applying the constraint that a maximal $T_{rf}$ of 5/fc (Table 1) can be used. That means, it is only at this very low Q=6 that the maximal bit rate of 848 kb/s can be attained. This is, of course, at the expense of having a very low power efficiency since, as Q decreases, the power efficiency decreases.

As can also be seen from FIG. 3, for lower bit rates, and thus longer acceptable $T_{rf}$, a higher Q is acceptable. For example, for the lowest bit rate, 106 kb/s, a maximal Q-factor between 20 and 25 is acceptable. More precisely, this is ≈24, as can be deduced from the Table of FIG. 3.

With reference to FIG. 3, the difference between the first curve 51 and the other curves 53, 55, 57 is that if the first curve 51 is a signal termed x(t). In other words, this is the original TX signal that has not been impacted by the resonating circuit transfer function. Here, "t" is the continuous time domain.

The remaining curves 53, 55, 57 can be written as:

$$y(t)=x(t)*h(t)$$

where

\* denotes the convolution operator, and h(t) is the representation of the resonating circuit transfer function in the time domain.

Thus, while we actually want to transmit x(t), due to the loading imposed by the resonating circuit we can only transmit x(t)*h(t). This has the disadvantage of a longer $T_{rf}$, and therefore a lower maximal bit rate than x(t).

However, if a function, xp(t), is generated by pre-distorting x(t) in such a way that xp(t)*h(t)=x(t) and applied for transmission instead of x(t) then, when xp(t) is convoluted by h(t), according to xp(t)*h(t)=x(t), x(t) will actually be transmitted.

In this way, whatever Q is, x(t) will be generated instead of x(t)*h(t). As mentioned above, x(t) is the original TX signal without being impacted by the resonating circuit. Accordingly, $T_{rf}$ is not impacted by the resonating circuit quality factor and so the bit rate is not limited by the quality factor.

Pre-Distortion of x(t)

Let hd(t) be the impulse response (IR) by which x(t) is distorted to obtain xp(t). This implies:

$$x(t)*hd(t)=xp(t) \qquad (4)$$

but we need:

$$xp(t)*h(t)=x(t) \qquad (5)$$

Equations (4) and (5) lead to:

$$x(t)*hd(t)*h(t)=x(t) \qquad (6)$$

Equation (6) gives:

$$hd(t)*h(t)=\delta(t) \qquad (7)$$

where $\delta(t)$ is the Dirac impulse signal.

In this described embodiment, we calculate h(t) and then derive hd(t) such that (7) is satisfied. Then, x(t) is convolved with hd(t) to obtain xp(t). At the moment of transmission, xp(t) is naturally convolved by h(t) and so, according to Equation (5), x(t) is transmitted.

In order to simplify the implementation, all the above equations can be applied in the baseband discrete time domain, in other words, in the "k" domain rather than the "t" domain, where t=kT, and T is the sampling interval of the continuous time function t.

The skilled person will identify and easily understand methods to measure h(k), and so a complete explanation will not be repeated here. However, one example of such a suitable method employs using a signal corresponding to white noise as the input of the system, x(k). White noise can be approximated using a maximal length sequence (MLS). The skilled person will recognise that if an MLS is applied as the input signal to the TX antenna, i.e. x(k), then the cross correlation of this input signal with the output signal y(k) will yield the impulse response of the system, h(k).

Once h(k) is measured, hd(k) is derived from it according to Equation (7).

Figure 4:
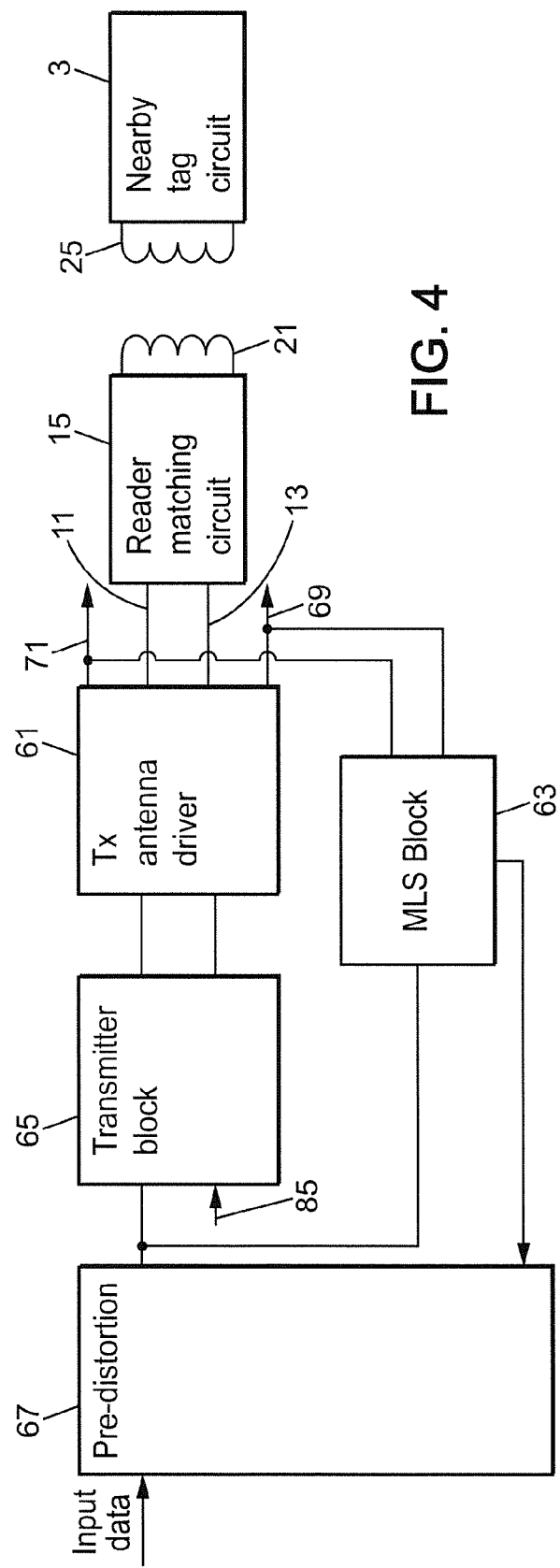
FIG. 4 illustrates a block diagram of an apparatus according to a described embodiment.

FIG. 4 illustrates an embodiment implemented in the form of a circuit. The circuit comprises a reader matching circuit 15 as discussed in relation to FIG. 1, which is connected to an antenna 21. For the purposes of illustration, the reader matching circuit 15 is shown to be nearby to a tag circuit 3, which has a corresponding antenna 25. Again, the tag circuit is as discussed in relation to FIG. 1. Accordingly, the details of these circuits will not be repeated here.

The reader matching circuit 15 is connected to a TX antenna driver 61 via the $TX_p$ 11 and the $TX_n$ connections of the reader matching circuit 15. Further details of this will be discussed in relation to FIG. 5 below. For clarity, the RX circuit is not illustrated. The TX antenna driver is connected to a transmitter block 65, which contains the transmitter for the reader matching circuit 15. Again, further details of this block will be discussed below in relation to FIG. 5. A pre-distortion block 67 provides a pre-distorted signal to the transmitter block 65 for transmission by the antenna 21. An MLS block 63 is indirectly connected to the $TX_p$ 11 and the $TX_n$ connections of the reader matching circuit 15 by a means that will be described in detail below in relation to FIG. 5.

Thus, in use, the MLS block 63 senses the distortion that is applied to the signal transmitted by the antenna 21 by the resonance of the combined reader 15 and tag 3 circuits. The pre-distortion block 67 then generates a pre-distortion to compensate for the applied distortion, and the transmitter block then generates the pre-distorted signal for transmission by applying the pre-distortion to a signal to be transmitted.

Figure 5:
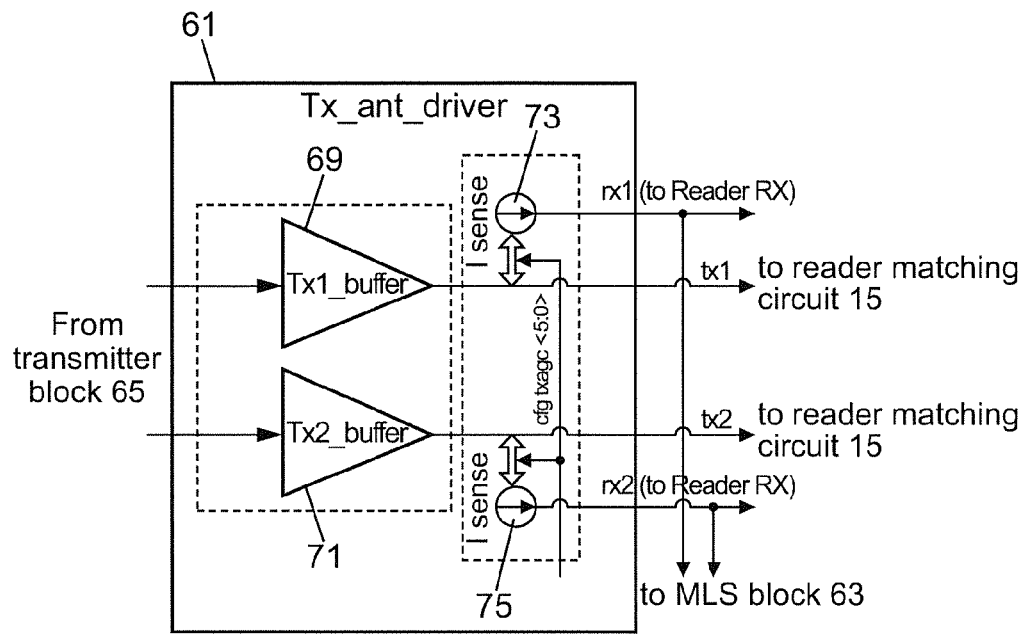
FIG. 5 illustrates detail of the Tx antenna driver of FIG. 4.

FIG. 5 illustrates the Tx antenna driver 61. The Tx antenna driver 61 relays the drive signals from the transmitter block 65 to the reader matching circuit 15. A buffer 69, 71 is provided on each of the signal paths to prevent interference from the reader matching circuit 15 from affecting the transmitter block 65. A current mirror 73, 75 is also connected to each signal in the Tx antenna driver 61, after the buffers 69, 71. The outputs from the current mirrors 73, 75 are provided to the MLS block 63 and also to the RX reader circuit (not illustrated). The current mirrors are configured to generate copies of the transmitter signals to prevent alteration of the load to the reader matching circuit 15 by the MLS block 63. The skilled reader will readily understand how to apply buffers and current mirrors to the signal paths, and so a detailed description will be omitted here.

Figure 6:
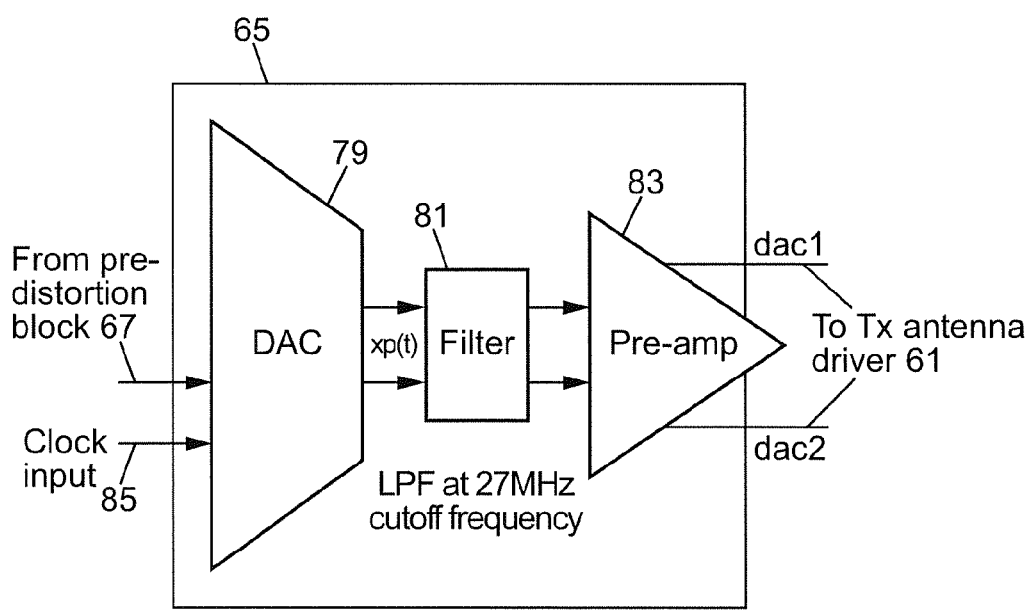
FIG. 6 illustrates detail of the transmitter block of FIG. 4.

FIG. 6 illustrates details of the transmitter block 65. The transmitter block 65 comprises a digital to analogue convertor 79 (DAC), which receives a digital input signal from the pre-distortion block 67. The DAC 79 also receives a clock input 85. In the present embodiment, the clock signal is of frequency 312 MHz, however other clock frequencies could equally be applied. The analogue output from the DAC 79 is filtered using a low-pass filter 81. In the present embodiment, the low-pass filter 81 has a cut-off frequency of 27 MHz, however other cut-off frequencies could equally be used. The filtered signal is then pre-amplified using a pre-amplifier 83. The skilled person will recognise how to apply the DAC 79, filter 81 and pre-amplifier 83, and so a more detailed explanation will be omitted.

Figure 7:
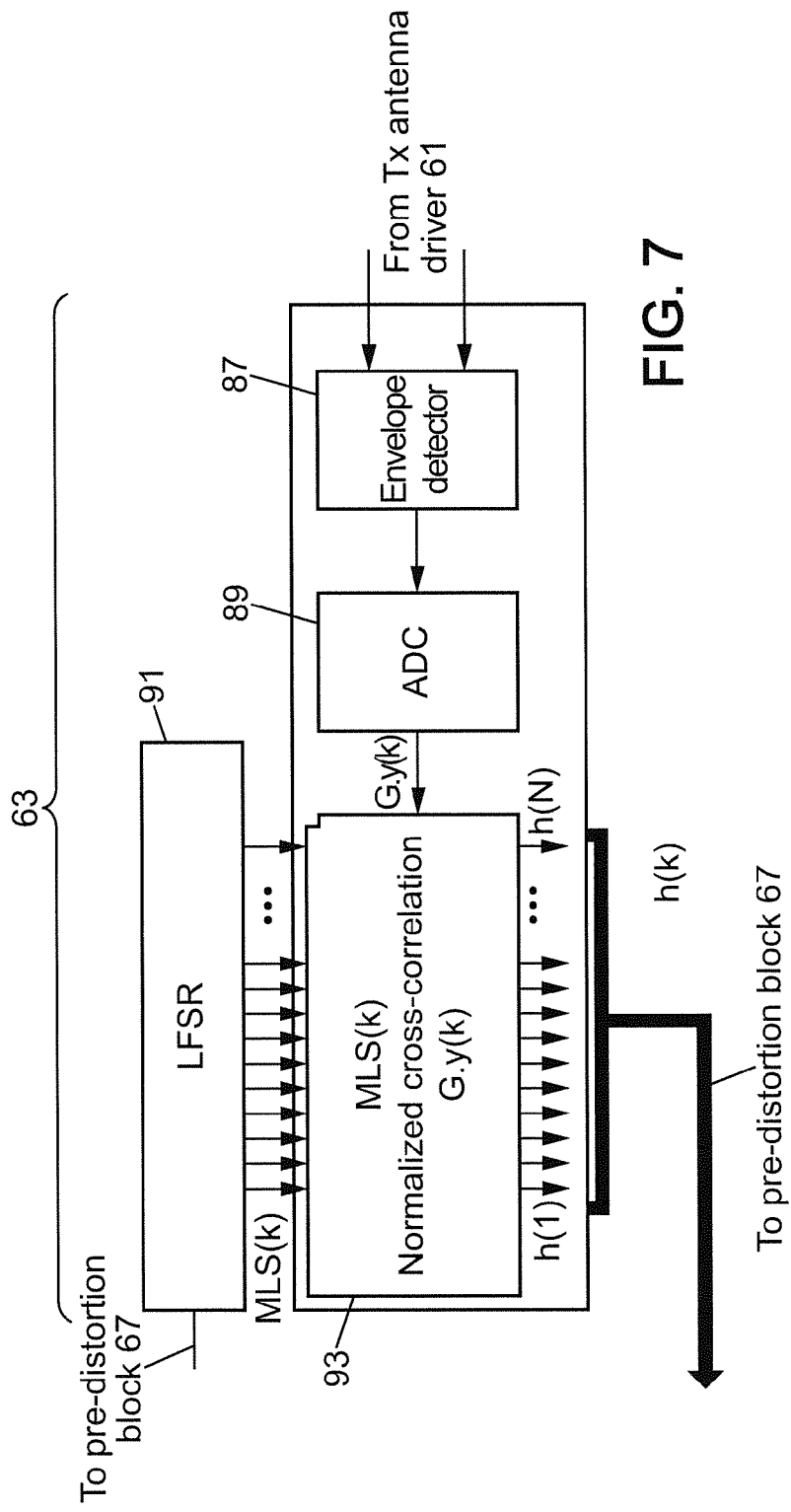
FIG. 7 illustrates detail of the MLS block of FIG. 4.

FIG. 7 illustrates the MLS block 63. The MLS block 63 receives the signals, G·y(t), output from the current mirrors 73, 75 in the Tx antenna driver 61, and processes these signals using an envelope detector 87. This yields the envelope of the radio frequency (RF) signals output from the current mirrors 73, 75, and thus is representative of the envelope of the RF signals observed at the inputs 11, 13 to the reader matching circuit 15.

The envelope signal output from the envelope detector 87 is then converted into a digital signal using an analogue to digital converter (ADC) 89. The digitised signal is then input to a normalised cross-correlation module 93. The normalised cross-correlation module 93 also receives an input from a linear feedback shift register (LFSR) 91. The skilled person will recognise that the LFSR 91 can be configured to generate an MLS. Thus, this input to the normalised cross-correlation module 93 is in the form of an MLS. The LFSR 91 also provides an input into the DAC 79 of the transmitter block 65.

In use, while determining the distortion that is applied to the signal transmitted by the antenna 21, the LFSR 91 applies the MLS signal to the input to the transmitter block 65. A distorted version of this MLS signal is then received at the normalised cross-correlation module 93 from the Tx antenna driver 61. The distortion arises as a result of the transfer function as described above. By then generating the cross-correlation of the applied signal with the distorted MLS signal, the resonating circuit transfer function h(t) can be obtained as described above. Thus, h(t) represents the distortion that is applied to the input signal.

The LFSR 91 is configured to generate a two-level maximum length sequence (MLS), the levels being either +1 or −1. This MLS is used as the signal transmitted by the antenna 21, and the distorted version of the signal is then cross-correlated with the original signal from the LFSR 91. In other words the MLS signal is cross-correlated with a distorted version of itself. The skilled person will recognise how to perform a cross-correlation of two signals, therefore a full explanation will be omitted.

The skilled person will recognise that the cross-correlation of an MLS signal with a distorted version of the same signal will yield the impulse response of the circuit that gives rise to the distortion. Accordingly, the output of the cross-correlation block 93 corresponds to a measure of the impulse response of the resonating circuit, in the form of a polynomial. The output of the cross-correlation block 93 actually corresponds to the first 16 coefficients in this polynomial, since higher-order coefficients tend to be of a small magnitude and are thus of lesser importance than the lower order coefficients. However, the skilled person will recognise that a larger or smaller number of coefficients can equally be used.

In the presently described embodiment, the MLS block 63 is only active during the time that the distortion is being evaluated. Typically, this will be during an evaluation period prior to the commencement of NFC communications.

However, in alternative embodiments, the MLS block 63 can be configured to be active throughout NFC communications, or at intermittent points during NFC communications. Thus, the distortion can be evaluated continually, or at intermittent points during NFC communications.

Figure 8:
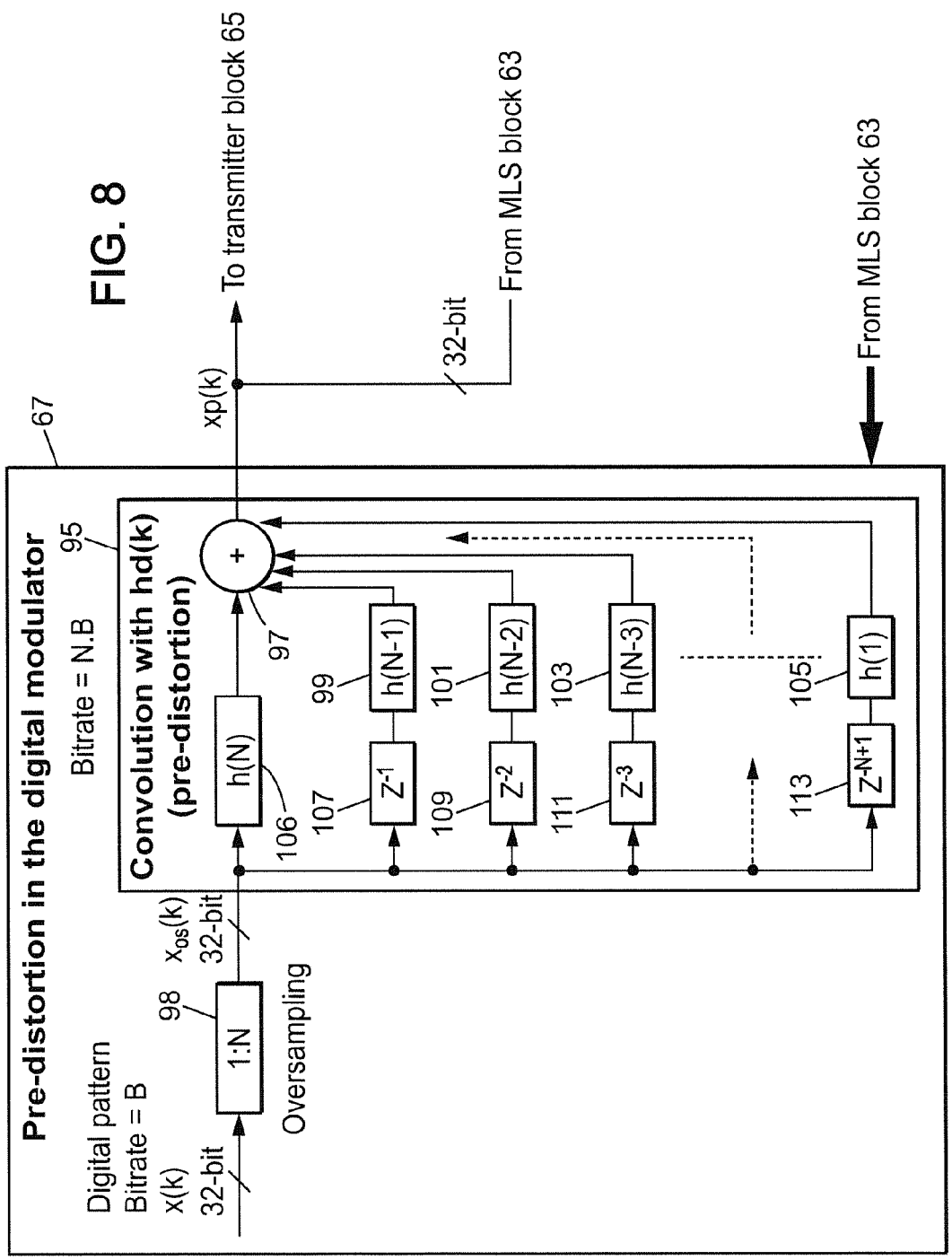
FIG. 8 illustrates detail of the pre-distortion block of FIG. 4.

FIG. 8 illustrates details of the pre-distortion block 67. The pre-distortion block 67 comprises a convolver 95 and a means for over sampling 98. The means for over sampling 98 converts the digital data, x(k), that is input to the pre-distortion block 67 into an over sampled version of the same data. As illustrated, the oversampling is in the ratio of 1:N. In other words, each bit is oversampled N times. In the described embodiment, the over sampling rate is 16 times, i.e. N=16. In other words each bit of input data is converted into 16 identical bits of data, each having a duration one sixteenth of the original data bit.

The convolver 95 is a digital block that implements hd(k), which is the time-sampled impulse response hd(t)). The time sampling rate of the convolver 95 is equal to an oversampling rate of the input data, x(k).

The function hd(t) is the inverse filter of h(t) and is a delayed, time reversed, copy of h(t). hd(t) is simply equal to h(N+1−t). Here N is used to denote the known length of the measured impulse response h(t).

The skilled person will recognize that various techniques can be used to generate the function hd(t). However, in the described embodiment a least-squares technique is implemented in the convolver 95. A least-squares problem is set up, requiring that the unknown inverse filter, hd(t), when convoluted with the original impulse response h(t), produces, as result, a delayed Dirac delta function. This can be formulated as a standard linear equation system, in which a square matrix [R] is multiplied by the unknown vector {hd}, producing the known terms vector {k}.

$$\text{where } [R] \cdot \{hd\} = \{k\}$$

upon solving this equation using a least-squares estimator, the result, hd, is a delayed time reversed copy of the original impulse response h(t).

The convolver 95 applies the convolution of hd(k) with the oversampled version of x(k) in order to obtain xp(k) as described above. In this way, the output of the Reader matching circuit 15 will be xp(t)*h(t)=x(t).

As illustrated in FIG. 8, the convolver 95 receives the coefficients of h(k) 99, 101, 103, 105 from the polynomial generated by the cross-correlation block 93. Each coefficient 99, 101, 103, 105 is multiplied by a function of the oversampled input signal $X_{os}$. For example, the h(N−1) coefficient 99 is multiplied by a function of the oversampled input signal, which we term $Z^{-1}$. Here, the exponent −1 indicates that the oversampled input signal $X_{os}$ is delayed by a time which is equal to the inverse of the oversampling frequency.

Similarly, the h(N−2) coefficient 101 is multiplied by the oversampled input signal 109 with a delay of twice the oversampling frequency. Corresponding multiplications are made for each of the coefficients derived in the MLS block 63. The h(N) component 106 is multiplied by the oversampled input signal with zero delay. The result of each of these multiplications is then combined in a combiner 97 by summation. The result of this combination then provides an approximation of the desired pre-distorted input xp(k).

Figure 9:
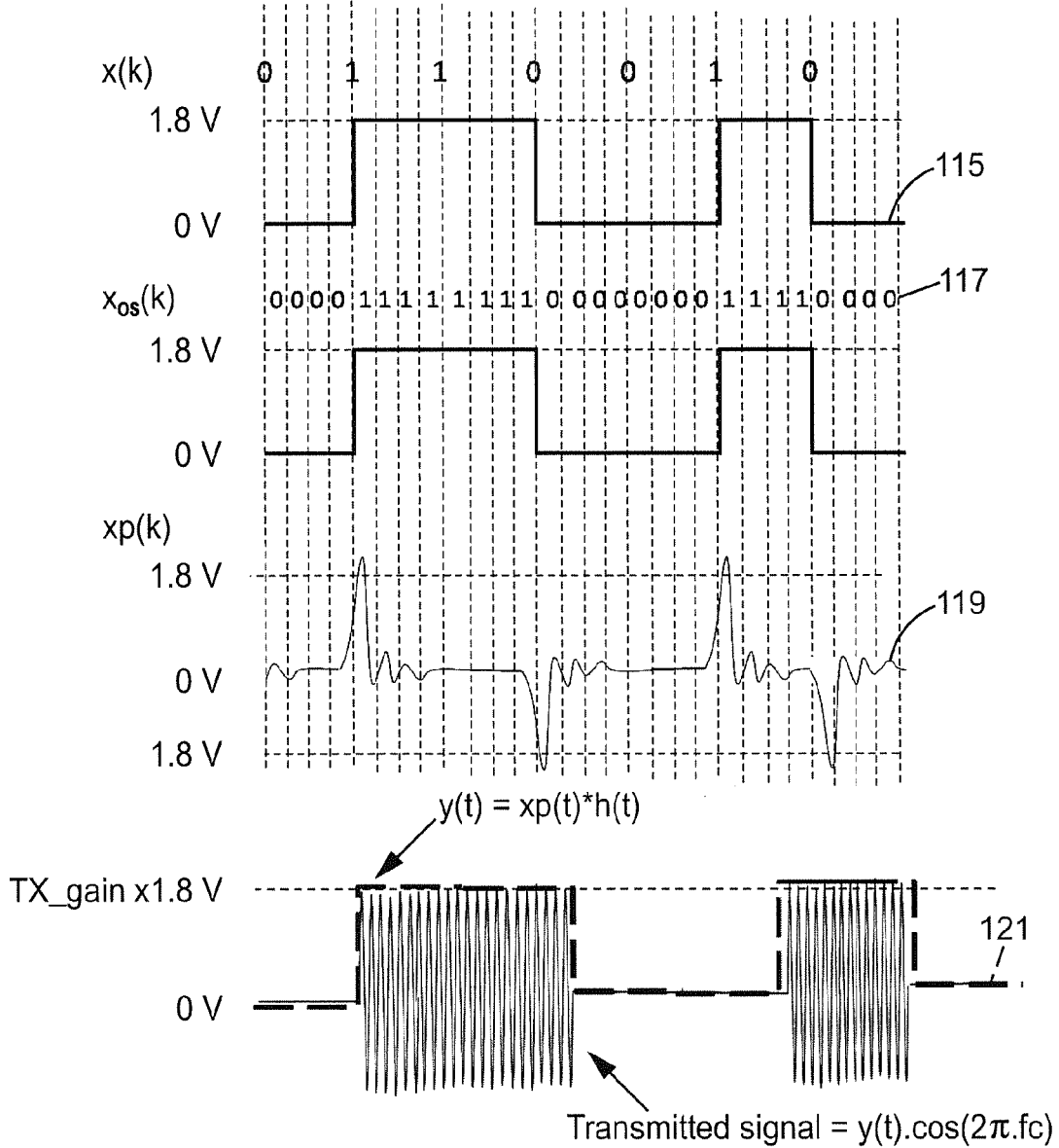
FIG. 9 illustrates examples of input and output signals, with and without pre-distortion.
Figure 9:
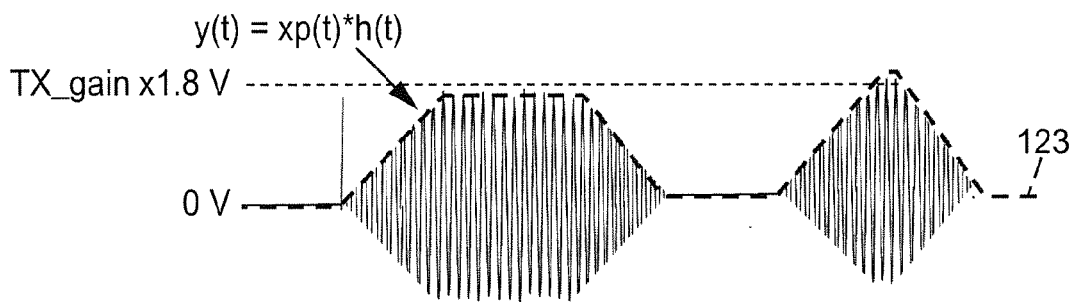

FIG. 9 illustrates simulation results of applying the method of the described embodiment. The input data signal 115 is illustrated in the top two traces, the first trace indicates the binary data, while the second trace indicates the corresponding signal. The third trace 117 indicates an oversampled version of the first trace. As illustrated, the oversampling is a factor of four. Thus, for each bit of data in the first trace 115, four identical data bits are present in the third trace 117. Accordingly, each '1' in the first trace 115 is represented in the third trace by '1111' and similarly each '0' is represented by '0000'. The four times oversampling is presented for the purposes of illustration only, and the invention is equally applicable to any over sampling rate. As noted above, in the embodiment described above, the over sampling rate is actually 16. The fourth trace indicates the signal representation of the oversampled data. As is clear from the trace, the oversampled data corresponds to the original signal.

The fifth trace 119 shows the pre-distorted signal, xp(k), that is applied for transmission after calculation of the required pre-distortion as described above. The sixth trace 121 indicates the actual signal that is emitted as a result of the pre-distorted signal 119 being distorted by the resonating circuit. As can be seen, the envelope of the emitted signal 121 corresponds to the desired data 115. The final trace in the FIG. 123 shows the envelope that would be output in the absence of an applied pre-distortion. As can be seen, the rise and fall time of the resonating circuit has impacted the achievable bit rate since the envelope is attenuated at the rising and falling edges of each envelope.

Figure 10:
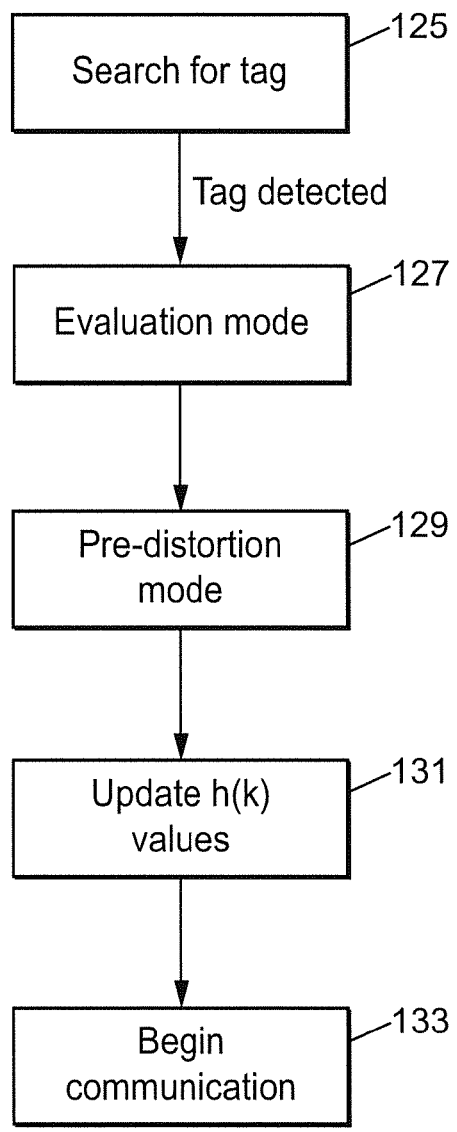
FIG. 10 illustrates a flow chart of a method according to a described embodiment.

FIG. 10 illustrates a flow chart showing an application of the described embodiment as applied to an NFC application in which communication is established between an NFC device and a nearby tag. Initially, 125, the NFC device is in a low power tag detection (LPTD) mode. During the LPTD mode, the NFC device repeatedly emits a low power signal, and listens for a response from any nearby tag device. As discussed above, if this low power signal is set to be an MLS, then the distortion resulting from the presence of the system can be determined. Thus, in the LPTD mode 125, the NFC device repeatedly determines the distortion of the antenna system. Should this distortion change, by for example a tag device coming into proximity to the NFC device, then this will result in a change to the distortion. This change can be detected by the method of determining distortion described above, and the skilled person will recognise that this change can be used to trigger the determination that a tag has been detected.

Once a tag is detected, the NFC device enters into an evaluation mode 127. In the evaluation mode 127, the NFC device determines the distortion resulting from the resonating circuit formed between the NFC device and the tag. This method of determining the distortion is as described above, and so will not be repeated here.

Once the distortion has been evaluated in the evaluation mode 127, the NFC device enters a pre-distortion mode 129. In this mode, the pre-distortion is performed in the digital modulator 67. In this mode, the values in the convolution block 95 are updated, so that the desired pre-distortion can be applied to an in-coming signal for transmission. At this point, the MLS block 63 can be deactivated since it is assumed that the distortion has been measured and will not change during NFC communications.

Once the pre-distortion values have been updated, the NFC device can begin communications 133. The communications can be carried out by NFC methods known in the art. Thus, the data signal x(k) for transmission will be input to the pre-distortion modulator 67, and pre-distorted to compensate for the distortion detected during the evaluation mode 127.

In the presently described embodiment, the MLS block 63 is deactivated after the NFC device leaves the evaluation mode 127. In other words, the distortion is evaluated only during the evaluation mode, and it is assumed that the distortion effect does not vary during the communication between the NFC device and the tag for the duration of the communications therebetween. In alternative or complimentary embodiments, the distortion is evaluated more than once during communications between the NFC device and the tag. Thus, in such embodiments, the evaluation mode is entered repeatedly, and pre-distortion values are updated during communications between the NFC device and the tag.

Simulation Results.

As an example to illustrate the described embodiment, simulation results shall now be presented to compare the achievable data rates with and without the application of the pre-distortion to the data signal.

In this example, we assume that the Reader TX of the NFC device is based on the well-known CG2910 controller. We also assume the following parameters:

$$\text{Resonant frequency}, fc = f_0 = 13.56 \text{ MHz}$$

Data rate, B=848 kb/sec

Oversampling rate, N=16

For the prior art case, i.e. without pre-distortion:

As noted above, in order to respect the maximal $T_{rf}=5/fc$ specification in Table 1, the maximally allowed Q-factor for the highest bitrate of 848 kb/s is between 5 and 10 (≈6 as can be deduced from FIG. 3).

Using the described embodiment, i.e. by applying pre-distortion:

As noted above, the maximally allowed Q-factor for the highest bitrate (848 kb/s) is 20. Alternatively, at Q=6 we can increase the bitrate to 8 Mb/s.

As a result, with the pre-distortion technique we can make our circuit function at 848 kb/s without any loss in the power efficiency since Q can still be as high as 20. Alternatively, we can attain much higher bitrates at lower Q values.

A further benefit of the described embodiment is that it can aid in reducing the negative effect of any nearby metallic, magnetic, or lossy objects (parasitic objects). The skilled person will recognise that the presence of such objects can adversely affect NFC communications since these objects can deform the resonating circuit transfer function. In other words h(k) will be altered. This can be to such an extent that the TX signal, y(t)=x(t)*h(t), effectively becomes unknown to the nearby Tag, thereby preventing the establishment of communications between an NFC device and a nearby tag.

However, by employing the pre-distortion technique as described above, the effect of the distortion can be mitigated and so h(t) is effectively cancelled by applying hd(t). As a result the distorting effect of such a nearby object can be largely, or entirely, eliminated.

The above described embodiments can be embedded in a computer program product, which comprises all the features enabling the implementation of the methods described herein, and which—when loaded in an information processing system—is able to carry out these methods. Computer program means or computer program in the present context mean any expression, in any language, code or notation, of a set of instructions intended to cause a system having an information processing capability to perform a particular function either directly or after either or both of the following a) conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the invention as broadly defined above.

A person skilled in the art will readily appreciate that various parameters disclosed in the description may be modified and that various embodiments disclosed and/or claimed may be combined without departing from the scope of the invention.

The invention claimed is:

1. A method of conditioning a first signal transmitted between a first and a second near field communication, NFC, device, the method comprising:
   executing, via the first NFC device, an evaluation mode comprising:
      determining a transfer function representative of a distortion arising from signal transfer from the first NFC device to the second NFC device by: (i) transmitting a second signal from the first NFC device to the second NFC device, the second signal comprising a maximum length sequence, MLS, and (ii) calculating a cross-correlation of the second signal with a version of the second signal modified by the transfer function to thereby derive a measure of the transfer function; and
      determining a pre-distortion function from the transfer function;
   switching, via the first NFC device, from the evaluation mode to a communication mode; and
   executing, via the first NFC device, the communication mode by applying the determined pre-distortion function to the first signal for a duration of communications between the first NFC device and the second NFC device, wherein the pre-distortion function at least partially compensates for the determined transfer function.

2. A method according to claim 1, wherein the pre-distortion function, hd(t), satisfies the relation:

$$hd(t)*h(t)=\delta(t)$$

where h(t) is the transfer function, * represents the convolution operator and δ(t) is the Dirac impulse signal.

3. A method according to claim 1, wherein the pre-distortion function is applied to an over-sampled version of the first signal.

4. A method according to claim 1, wherein the pre-distortion function is applied to the first signal by convolving the pre-distortion function with the first signal.

5. A method according to claim 4, wherein the convolution is applied digitally in the form of discrete coefficients.

6. A method according to claim 1, wherein the distortion arises at least in part as a result of the influence of a metallic object and/or a third NFC device.

7. A non-transitory computer program product comprising computer readable instructions which, when implemented on a processor, cause the processor to perform the method of claim 1.

8. A non-transitory computer readable medium comprising the non-transitory computer program product according to claim 7.

9. An apparatus for near field communications, NFC, the apparatus comprising:
   an NFC emitter;

circuitry for enabling the apparatus to operate in a plurality of modes including an evaluation mode and a communication mode;

wherein during the evaluation mode, the apparatus determines a transfer function representative of a distortion arising from emission by the NFC emitter when in communication range with a second NFC apparatus by: (i) transmitting a second signal from the apparatus to the second NFC apparatus, the second signal comprising a maximum length sequence, MLS, and (ii) calculating a cross-correlation of the second signal with a version of the second signal modified by the transfer function to thereby derive a measure of the transfer function;

wherein during the evaluation mode, the apparatus also determines a pre-distortion function from the transfer function; and wherein during the communication mode, the apparatus applies the pre-distortion function to a signal for transmission by the apparatus for a duration of communications between the apparatus and the second NFC apparatus, wherein the pre-distortion function at least partially compensates for the determined transfer function.

10. A wireless device comprising the apparatus according to claim 9.

11. An NFC reader device comprising the apparatus according to claim 9.

12. A method, comprising:

executing, via a first device, an evaluation mode comprising: (i) determining a transfer function representative of a distortion arising during signal transfer from the first device to a second device during near field communication, and (ii) determining a pre-distortion function from the transfer function;

switching, via the first device, from the evaluation mode to a communication mode; and executing, via the first device, the communication mode by applying the determined pre-distortion function to signals transmitted to the second device for a duration of communications between the first device and the second device, wherein the pre-distortion function at least partially compensates for the determined transfer function.

13. A method according to claim 12, wherein the pre-distortion function, hd(t), satisfies the relation:

$$hd(t)*h(t)=\delta(t)$$

where h(t) is the transfer function, * represents the convolution operator and δ(t) is the Dirac impulse signal.

14. A method according to claim 12, wherein the pre-distortion function is applied to over-sampled versions of the signals.

15. A method according to claim 12, wherein the pre-distortion function is applied to the signals by convolving the pre-distortion function with the signals.

16. A method according to claim 15, wherein the convolution is applied digitally in the form of discrete coefficients.

17. A method according to claim 12, wherein the distortion arises at least in part as a result of the influence of at least one of a metallic object and a third device.

* * * * *